(12) United States Patent
Wu et al.

(10) Patent No.: US 10,991,960 B2
(45) Date of Patent: Apr. 27, 2021

(54) ELECTROLYTE STORAGE TANK, FLOW BATTERY, BOX-TYPE FLOW BATTERY SYSTEM AND CHARGE-DISCHARGE CONTROL METHOD OF FLOW BATTERY

(71) Applicant: DALIAN RONGKEPOWER CO., LTD, Liaoning (CN)

(72) Inventors: Jingbo Wu, Liaoning (CN); Huamin Zhang, Liaoning (CN); Xiangkun Ma, Liaoning (CN); Hongbo Wang, Liaoning (CN); Ying Quan, Liaoning (CN); You Wang, Liaoning (CN); Xi Han, Liaoning (CN); Jun Li, Liaoning (CN)

(73) Assignee: DALIAN RONGKEPOWER CO., LTD, Liaoning (CN)

(*) Notice: Subject to any disclaimer, the term of this patent is extended or adjusted under 35 U.S.C. 154(b) by 335 days.

(21) Appl. No.: 16/085,184

(22) PCT Filed: Mar. 14, 2016

(86) PCT No.: PCT/CN2016/076292
§ 371 (c)(1),
(2) Date: Jan. 10, 2019

(87) PCT Pub. No.: WO2017/156681
PCT Pub. Date: Sep. 21, 2017

(65) Prior Publication Data
US 2019/0131639 A1    May 2, 2019

(51) Int. Cl.
*H01M 8/04* (2016.01)
*H01M 8/04186* (2016.01)
(Continued)

(52) U.S. Cl.
CPC ... *H01M 8/04186* (2013.01); *H01M 8/04029* (2013.01); *H01M 8/04201* (2013.01);
(Continued)

(58) Field of Classification Search
None
See application file for complete search history.

(56) References Cited

U.S. PATENT DOCUMENTS

2014/0255734 A1* 9/2014 Tennessen .............. H01M 8/20
429/51

FOREIGN PATENT DOCUMENTS

| CN | 102593490 A | 7/2012 |
| CN | 203466259 U | 3/2014 |

(Continued)

*Primary Examiner* — Ula C Ruddock
*Assistant Examiner* — Tony S Chuo
(74) *Attorney, Agent, or Firm* — Novick, Kim & Lee, PLLC; Allen Xue (57) ABSTRACT

A flow battery system has an electrolyte storage tank, a flow battery, and a box-type flow battery system. A circular pipe I and a circular pipe II are provided in the electrolyte storage tank; the circular pipe II is communicated with an electrolyte return opening; the circular pipe I is communicated with an electrolyte delivery outlet; the annular perimeter of the circular pipe I is not equal to the annular perimeter of the circular pipe II. The multi-layer circular pipe structure in the storage tank reduces the flowing dead zone of electrolyte in the storage tank. Moreover, The reduction in the longitudinal distance between the electrolyte delivery outlet and the electrolyte return opening also reduced the problem of SOC lag so that the SOC monitoring accuracy of the flow battery is improved.

20 Claims, 8 Drawing Sheets

(51) Int. Cl.
    *H01M 8/04537*    (2016.01)
    *H01M 8/04858*    (2016.01)
    *H01M 8/18*    (2006.01)
    *H01M 8/04029*    (2016.01)
    *H01M 8/04082*    (2016.01)
    *H01M 8/04276*    (2016.01)

(52) U.S. Cl.
    CPC ... *H01M 8/04276* (2013.01); *H01M 8/04611* (2013.01); *H01M 8/04619* (2013.01); *H01M 8/04873* (2013.01); *H01M 8/04902* (2013.01); *H01M 8/18* (2013.01); *H01M 8/188* (2013.01)

(56) References Cited

FOREIGN PATENT DOCUMENTS

| | | |
|---|---|---|
| CN | 104018191 A | 9/2014 |
| CN | 203807570 U | 9/2014 |
| CN | 104882620 A | 9/2015 |
| JP | 2001043884 A | 2/2001 |

\* cited by examiner

ELECTROLYTE STORAGE TANK, FLOW BATTERY, BOX-TYPE FLOW BATTERY SYSTEM AND CHARGE-DISCHARGE CONTROL METHOD OF FLOW BATTERY

TECHNICAL FIELD

The present invention relates to the technical field of flow batteries, and in particular to an electrolyte storage tank, a flow battery, a box-type flow battery system and a charge-discharge control method of the flow battery.

BACKGROUND ART

Large-scale, long-life, low-cost, and environmentally-friendly energy storage technologies are the main directions for the development of energy storage technologies. The flow battery energy storage technology has become one of the first choices of large-scale energy storage technologies because of its long service life, large energy storage scale, safety and reliability, no pollution, good battery uniformity, fast response, and real-time direct monitoring of its charging and discharging states. By configuration of the corresponding energy storage, the unstable characteristics of renewable energy power generation can be greatly solved to realize smooth output and effectively adjust the time difference contradiction between power generation and power consumption, thereby ensuring continuous and stable power supply.

A flow battery is mainly composed of the following parts: 1) cell stacks; 2) positive and negative electrolyte and storage tanks thereof; 3) an electrolyte circulation system; and 4) a battery management system. During the operation of the flow battery, the electrolyte in the positive and negative electrolyte storage tanks flows through the electrolyte circulation system and the cell stacks under the impetus of a circulation pump, and undergoes an electrochemical reaction in the cell stacks, such that the concentration of active materials of electrolyte entering the cell stacks changes, and then the electrolyte returns to the positive and negative electrolyte storage tanks and is mixed with the electrolyte in the storage tanks.

The electrolyte storage tank is an important component for accommodating the electrolyte, and the optimization of the internal structure of the electrolyte storage tank will affect the mixing uniformity of the electrolyte in the storage tank, thereby affecting the overall performance of the flow battery. In the prior art, the storage tank of the flow battery is mainly cylindrical, and there are only a simple electrolyte output pipeline and an electrolyte return pipeline inside the storage tank, such that it is difficult for the electrolyte to be mixed sufficiently and uniformly inside the storage tank. There is always a certain dead angle, which is unreachable upon the circulation of the electrolyte, in the center or diagonal position inside the storage tank, and therefore, the utilization rate of the electrolyte is greatly reduced, the cost of the battery system is further increased, and the performance of the battery system is reduced.

Secondly, when the flow battery is being charged, the charge cutoff condition is usually achieved by setting the upper limit of a charge voltage. The upper limit of the charge voltage in the prior art is set to a fixed value. Since the flow battery is prone to side reactions under a high SOC condition, long-term high SOC charging can cause the capacity of the flow battery to decay. In addition, under a low SOC condition, the flow battery cannot achieve more power input due to the limited cutoff voltage, which causes the chargeable capacity and energy efficiency of the flow battery to be affected.

Thirdly, since the electrolyte is a solution having certain corrosiveness, it circulates through a plurality of components such as the electrolyte storage tank, the electrolyte pipelines, and the cell stacks, and therefore there is a certain risk of electrolyte leakage. The prior art does not provide a series of measures such as an overall liquid leakage alarm, placement diffusion, and liquid leakage treatment of the battery system. Therefore, for a flow battery system which is applied in a large scale, there is still an unavoidable electrolyte leakage accident, resulting in a larger safety hazard.

In addition, the state of charge (SOC) is a parameter that reflects the electric quantity state of the battery, and is the most direct basis for the precise control and management of the battery system, and is also one of the most important parameters of the flow battery, and therefore real-time and accurate SOC is critical to ensure high reliability of the battery system, improve the use effect of the battery and prolong the battery life. Since there is a certain distance between an electrolyte outlet and an electrolyte inlet of the positive and negative electrode electrolyte storage tanks, the SOC of the electrolyte in the positive and negative electrolyte storage tanks is distributed in a gradient when the flow battery is charged and discharged. Since it is only considered in an SOC detection method of the flow battery in the prior art that a detection point is provided at an outlet of the cell stack, rather than a comprehensive consideration of the SOC detection result in a certain period of time, the detection result cannot reflect the actual SOC of the electrolyte inside the storage tank.

SUMMARY OF THE INVENTION

In order to overcome the above technical defects, the present invention provides an electrolyte storage tank which is provided with an electrolyte return opening and an electrolyte delivery outlet; an circular pipe I and a circular pipe II are provided inside the electrolyte storage tank; the circular pipe II is communicated with the electrolyte return opening; the circular pipe I is communicated with the electrolyte delivery outlet; the annular perimeter of the circular pipe I is not equal to the annular perimeter of the circular pipe II; a plurality of liquid holes is formed in tube walls of both of the annular tube I and the annular tube II. According to the present invention, the plurality of liquid holes formed in tube walls of both of the annular tube I and the annular tube II refers to through holes through which electrolyte flows in or out. These circular pipes and holes allow the electrolyte to flow and mix sufficiently inside the electrolyte storage tank, and shorten the distance by which the returned electrolyte is discharged, thereby increasing the electrolyte utilization rate and reducing the SOC (state of charge) lag.

Further, the annular perimeter of the circular pipe II is greater than the annular perimeter of the circular pipe I; the circular pipe II is located on the periphery of the circular pipe I.

Further, the liquid holes of the circular pipe II are located on the periphery of an inner ring of the circular pipe II.

Further, the liquid holes of the circular pipe I are located on the periphery of an outer ring and/or an inner ring of the circular pipe I.

Further, the circular pipe I and the circular pipe II are in the shape of a circular ring or a square ring respectively.

Further, a plurality of layers of circular pipes I and a plurality of layers of circular pipe II are provided inside the electrolyte storage tank.

Further, the electrolyte storage tank is further provided with an electrolyte return pipeline and an electrolyte output pipeline; the electrolyte return opening, the electrolyte return pipeline and the circular pipe II are communicated in sequence; the circular pipe I, the electrolyte output pipeline and the electrolyte delivery outlet are communicated in sequence.

Further, the circular pipe II is fixed to the inner wall of the electrolyte storage tank.

Further, a support body or an orifice plate for fixing the circular pipe I and/or the circular pipe II is also provided inside the electrolyte storage tank. The support body for fixing the circular pipe I and/or the circular pipe II of the present invention refers to a reinforcing rib or a bracket or the like which can provide support for the circular pipe I and/or the circular pipe II. The orifice plate for fixing the circular pipe I of the present invention refers to a plate provided with a plurality of holes. The holes each have a hole diameter slightly larger than the outer diameter of each of the circular pipe I and the circular pipe II, and play a role of fixing the circular pipe I by connecting the circular pipe I and the circular pipe II simultaneously in a penetrating manner. Additional holes (holes not passing through the circular pipe I or the circular pipe II) in the orifice plate may also facilitate mixing and flowing of the electrolyte.

The present invention further provides a flow battery comprising the electrolyte storage tank.

Further, the flow battery comprises a positive electrolyte storage tank and a negative electrolyte storage tank, wherein the volume of the negative electrolyte storage tank is greater than the volume of the positive electrolyte storage tank.

Further, a ratio of the volume of the positive electrolyte storage tank to the volume of the negative electrolyte storage tank is 1:(1.1 to 1.5).

Further, a ratio of the positive electrolyte storage tank to the volume of the negative electrolyte storage tank is 1:1.2.

Further, the flow battery is provided with a pipeline for communicating a gaseous phase portion of the positive electrolyte storage tank and a gaseous phase portion of the negative electrolyte storage tank.

Further, a pipeline and a valve for communicating a liquid phase portion of the positive electrolyte storage tank and a liquid phase portion of the negative electrolyte storage tank is provided at the bottom of the positive electrolyte storage tank and the negative electrolyte storage tank respectively.

Based on the flow battery, the present invention further provides a flow battery control method, comprising the following steps:

step B1: disposing an SOC detection device respectively at a positive electrolyte outlet and a negative electrolyte outlet of an cell stack;

step B2: acquiring, by the SOC detection devices, SOCs at the electrolyte outlets of the cell stack under an initial state of the flow battery;

step B3: at every preset time, obtaining the volume of electrolyte in the positive electrolyte storage tank, the volume of electrolyte in the negative electrolyte storage tank, the volume of electrolyte flowing into the positive electrolyte storage tank, and the volume of electrolyte flowing into the negative electrolyte storage tank, and meanwhile, acquiring, by the SOC detection devices, SOCs at the electrolyte outlets of the cell stack; and step B4: obtaining SOC of the flow battery according to the volume of the electrolyte in the positive electrolyte storage tank, the volume of the electrolyte in the negative electrolyte storage tank, the volume of the electrolyte flowing into the positive electrolyte storage tank, the volume of the electrolyte flowing into the negative electrolyte storage tank, which are acquired at each time, and the SOCs at the electrolyte outlets of the cell stack, and in combination with the SOCs at the electrolyte outlets of the cell stack under the initial state of the flow battery;

further, the SOC of the flow battery is calculated according to the following formula:

$$SOC = \left(1 - \frac{\Delta V_1}{V_1}\right) * \left(1 - \frac{\Delta V_2}{V_2}\right) * \ldots * \left(1 - \frac{\Delta V_i}{V_i}\right) * \ldots * \left(1 - \frac{\Delta V_n}{V_n}\right) * SOC_0 +$$

$$\frac{\Delta V_1}{V_1} * \left(1 - \frac{\Delta V_2}{V_2}\right) * \left(1 - \frac{\Delta V_3}{V_3}\right) * \ldots * \left(1 - \frac{\Delta V_i}{V_i}\right) * \ldots *$$

$$\left(1 - \frac{\Delta V_n}{V_n}\right) * SOC_1 + \frac{\Delta V_2}{V_2} * \left(1 - \frac{\Delta V_3}{V_3}\right) * \left(1 - \frac{\Delta V_4}{V_4}\right) *$$

$$\ldots * \left(1 - \frac{\Delta V_i}{V_i}\right) * \ldots * \left(1 - \frac{\Delta V_n}{V_n}\right) * SOC_2 + \ldots +$$

$$\frac{\Delta V_i}{V_i} * \left(1 - \frac{\Delta V_{i+1}}{V_{i+1}}\right) * \left(1 - \frac{\Delta V_{i+2}}{V_{i+2}}\right) * \ldots * \left(1 - \frac{\Delta V_n}{V_n}\right) *$$

$$SOC_i + \ldots + \frac{\Delta V_{n-1}}{V_{n-1}} * \left(1 - \frac{\Delta V_n}{V_n}\right) * SOC_{n-1} + \frac{\Delta V_n}{V_n} * SOC_n$$

in the formula, $$V_i = \frac{V_{pi} + V_{ni}}{2}, \Delta V_i = \frac{\Delta V_{pi} + \Delta V_{ni}}{2},$$

wherein $V_{pi}$ represent the volume of the electrolyte in the positive electrolyte storage tank after the elapse of time $i*\Delta t$ from the operation of the flow battery; $V_{rd}$ represents the volume of the electrolyte in the negative electrolyte storage tank after the elapse of time $i*\Delta t$; $\Delta V_{pi}$ represents the volume of the electrolyte flowing into the positive electrolyte storage tank within the ith $\Delta t$ time; $\Delta V_{rd}$ represents the volume of the electrolyte flowing into the negative electrolyte storage tank within the ith $\Delta t$ time; $SOC_1$ represents the SOC at the electrolyte outlet of the cell stack obtained by the SOC detection device after the elapse of time $i*\Delta t$ from the operation the flow battery; i is 1, 2, ... n; n represents the number of the $\Delta t$ time elapsed.

Based on the flow battery, the present invention further provides a box-type flow battery system comprising the flow battery, wherein the flow battery further comprises an cell stack unit disposed on a box body support, a heat exchanger system and respective pipeline systems, wherein the box-type flow battery system further comprises a multi-stage liquid leakage collection alarm system, the multi-stage leakage collection alarm system at least comprising first-stage liquid leakage collection tanks, second-stage liquid leakage collection tanks, and a liquid leakage management system;

the first-stage liquid leakage collection tanks are respectively located below the cell stack unit, the electrolyte storage tank, the pipeline systems and the heat exchanger system of the flow battery, and configured to collect liquid leaked from the cell stack unit, the electrolyte storage tank, the respective pipeline systems and the heat exchanger system;

the second-stage liquid leakage collection tanks are located below the box body of the box-type flow battery system, communicated with the first-stage liquid leakage collection tanks and configured to converge the liquid leakages collected by the first-stage liquid leakage collection tanks; each second-stage liquid leakage collection tank is further provided with a liquid leakage sensor configured to monitor whether liquid leakage appears in the second-stage liquid leakage collection tank in real time;

the liquid leakage management system determines whether the flow battery needs to perform an operation of alarming or powering off according to the detection result of the liquid leakage sensor.

Based on the flow battery, the present invention further provides a flow battery comprising a flow battery charge-discharge control system, the flow battery charge-discharge control system comprising:

a first monitoring unit configured to detect SOC of the flow battery;

a first determination unit connected with the first monitoring unit and configured to determine whether the SOC of the flow battery is between an SOC lower limit and an SOC upper limit, wherein the current voltage of the flow battery is kept unchanged when the SOC of the flow battery is between the SOC lower limit and the SOC upper limit;

a first control unit connected with the first determination unit and configured to adjust a voltage of the flow battery to be lower than a first preset voltage when the SOC of the flow battery is greater than or equal to the SOC upper limit, and adjust the voltage of the flow battery to be between the first preset voltage and a second preset voltage when the SOC of the flow battery is less than or equal to the SOC lower limit, the second preset voltage being higher than the first preset voltage.

Further, the flow battery charge-discharge control system further comprises:

a second monitoring unit configured to detect a voltage of each cell stack included in the flow battery;

a second comparison unit connected with the second monitoring unit and configured to compare a difference between the voltages of any two of the cell stacks with a first voltage threshold;

a second control unit connected with the second comparison unit and configured to, after the second comparison unit obtains a comparison result that the difference between the voltages of any two of the cell stacks is greater than or equal to the first voltage threshold, lower the upper limit of a charge voltage of the flow battery and adjust a charge current of the flow battery when the flow battery is in a charging state, and increase the lower limit of a discharge voltage of the flow battery and adjust a discharge current of the flow battery when the flow battery is in a discharging state.

Further, the flow battery charge-discharge control system further comprises:

a third comparison connected with the second comparison unit and the second control unit and configured to, after the second comparison unit obtains a comparison result that the difference between the voltages of any two of the cell stacks is less than the first voltage threshold, or after the second control unit lowers the upper limit of the charge voltage of the flow battery and adjusts the charge current of the flow battery, or lowers the upper limit of the charge voltage of the flow battery and adjusts the charge current of the flow battery, compare the difference between the voltages of any two of the cell stacks with a second voltage threshold; the second control unit controls the flow battery to power off according to a comparison result obtained by the third comparison unit that the difference between the voltages of any two cell stacks is greater than or equal to the second voltage threshold; the second comparison unit, after the third comparison unit obtains a comparison result that the difference between the voltages of any two cell stacks is less than the second voltage threshold, continues to compare the difference between the voltages of any two of cell stacks with the first voltage threshold.

Based on the flow battery, the present invention further provide a flow battery charge-discharge control method, which is used for controlling a charge-discharge process of the flow battery, wherein the method further comprises the following steps:

step 1: detecting SOC of the flow battery;

step 2: determining whether the SOC of the flow battery is between the SOC lower limit and the SOC upper limit, if so, executing step 3, or executing step 4;

step 3: keeping a voltage of the flow battery unchanged; and step 4: adjusting a voltage of the flow battery to be lower than a first preset voltage when the SOC of the flow battery is greater than or equal to the SOC upper limit, and adjusting the voltage of the flow battery to be between the first preset voltage and a second preset voltage when the SOC of the flow battery is less than or equal to the SOC lower limit, the second preset voltage being higher than the first preset voltage.

Further, after step 4, the flow battery charge-discharge control method further comprises the following steps:

step 5: detecting a voltage of each cell stack included in the flow battery, and executing step 6;

step 6: comparing the difference between the voltages of any two cell stacks with the first voltage threshold, and executing step 7 if the difference between the voltages of any two of the cell stacks is greater than equal to the first voltage threshold; and step 7: lowering the upper limit of a charge voltage of the flow battery and adjusting a charge current of the flow battery when the flow battery is in a charging state, and increasing the lower limit of a discharge voltage of the flow battery and adjusting a discharge current of the flow battery when the flow battery is in a discharging state.

Further, the flow battery charge-discharge control method comprises:

executing step 8 if the difference between the voltages of any two of cell stacks is less than the first voltage threshold or after step 7 is executed;

step 8: comparing the difference between the voltages of any two cell stacks with the second voltage threshold, powering off the flow battery if the difference between the voltages of any two cell stacks is greater than or equal to the second voltage threshold, and returning to step 6 if the difference between the voltages of any two cell stacks is less than the second voltage threshold.

Due to the adoption of the above technical solutions, compared with the prior art, the present invention has the following advantages:

1. the multi-layer circular pipe structure inside the storage tank greatly reduces the dead zone of electrolyte flowing inside the storage tank, so that the flowing of the electrolyte is more uniform and the utilization rate of the electrolyte is greatly increased. Moreover, since the longitudinal distance between the electrolyte delivery outlet and the electrolyte return opening is reduced, the problem of SOC lag is effectively solved, and the SOC monitoring accuracy of the flow battery is improved.

2. An intelligent control strategy is implemented according to the state of charge of the flow battery to optimize the SOC usage interval of the flow battery, so that the reaction polarization of the flow battery at the end of charge and discharge is greatly reduced, and the performance and life of the flow battery are improved and prolonged.

3. By effectively adjusting the SOC working interval of the flow battery, the side reactions of the flow battery are reduced, and the capacity attenuation caused by the operation of the flow battery under high SOC is solved.

4. By lowering the upper limit of the charge voltage and increasing the lower limit of the discharge voltage, the problem that the charging and discharging performances of the flow battery at the end of charge and discharge are poor is solved, and the charge and discharge capacity and energy efficiency of the flow battery are improved.

5. The multi-stage liquid leakage collection alarm system is integrated onto the flow battery system to expand the liquid leakage protection range and avoid secondary pollution caused by leakage of droplets, and the collected liquid leakage can be reused after being treated, thereby completely solving the liquid leakage problem of the flow battery, and improving the safety of the flow battery.

6. By selecting a mode in which the volumes of the positive and negative storage tanks are different, it is possible ensure that the concentration/volume/the total amount of active materials of the negative electrolyte is always different from that of the positive electrolyte, thereby inhibiting the hydrogen evolution ability of the active materials of the negative electrolyte, improve the capacity retention capacity of the flow battery and reduce the capacity attenuation of the flow battery after long-term operation.

7. The structures for communicating the gaseous phases and the liquid phases of the positive and negative storage tanks can realize rebalancing of the capacity/volume/concentration of the positive and negative electrolytes in the operation of the flow battery, reduce the capacity attenuation and improve the long-term operation ability of the flow battery.

DESCRIPTION OF DRAWINGS

There are ten drawings for the present invention, in which
FIG. 10 is a structural schematic diagram of a multi-stage liquid leakage collection alarm system in Embodiment 2 of the present invention.
In drawings, numerical symbols represent the following components: 1. cell stack; 2. BMS cabinet; 3. electrolyte storage tank; 4. heat exchanger; 5. compression refrigerator; 6. filter; 7. circulation pump; 8. second. stage liquid leakage collection tank; 9. liquid leakage sensing alarm; 10. cell stack and pipeline equipment support; 11. first-stage liquid leakage collection tank at upper-layer cell stack unit; 12. electrolyte pipeline system; 13. first-stage liquid leakage collection tank at heat exchanger; 14. PCS and UPS; 15. first-stage liquid leakage collection tank guide pipe; 16. first-stage liquid leakage collection tank at circulation pump and filter; 54. circular pipe I; 55. circular pipe II; 56. circular pipe support orifice plate; 57. holes in circular pipe support orifice plate; 59. secondary protection groove of electrolyte storage tank; 60. welding partition on secondary protection groove; 61. movable baffle on the secondary protection tank; 68. electrolyte return opening; 69. electrolyte delivery outlet; 70. electrolyte return pipeline; 71. electrolyte output pipeline; 72. pipeline for communicating liquid phase portions of positive electrolyte storage tank and negative electrolyte storage tank; 73. pipeline for communicating gaseous phase portions of the positive electrolyte storage tank and the negative electrolyte storage tank; 74. valve; 75. electrolyte level in electrolyte storage tank; 76. gaseous phase portion of electrolyte storage tank; 77. liquid phase portion of electrolyte storage tank.

DETAILED DESCRIPTIONS OF THE PREFERRED EMBODIMENTS

The following non-limiting embodiments are provided to enable a person of ordinary skill in the art to understand the present invention more completely, but not to limit the present invention in any way.

Embodiment 1

Figure 5:
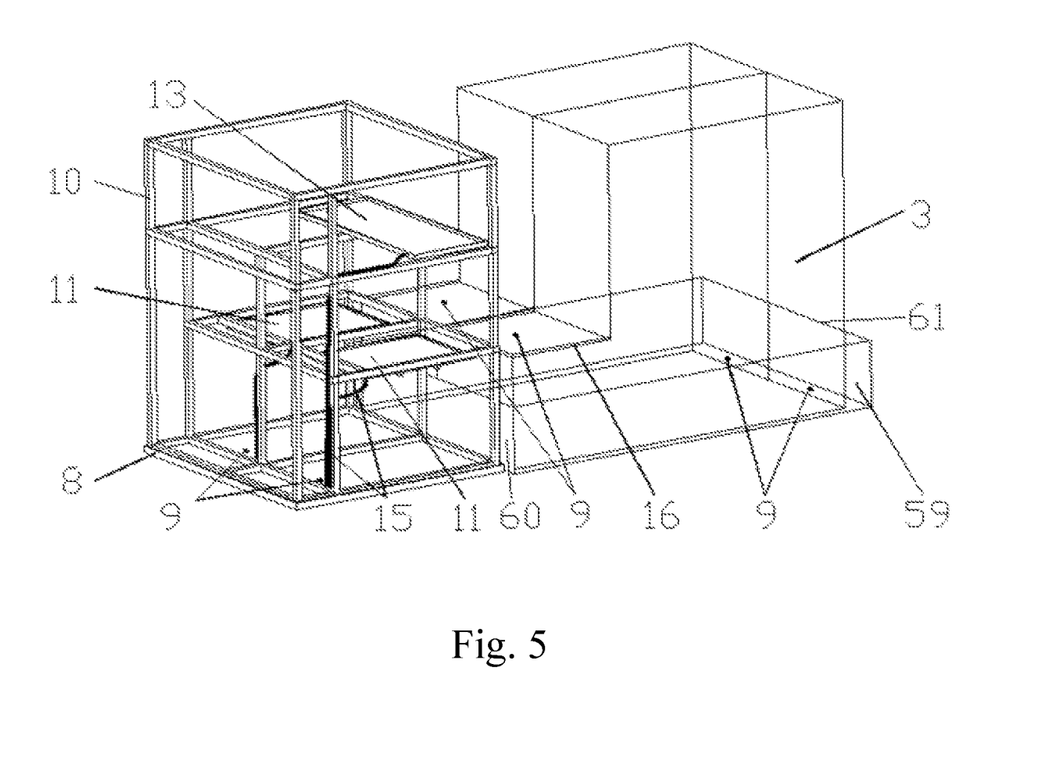
FIG. 5 is a structural schematic diagram of a multi-stage liquid leakage collection alarm system.
Figure 6:
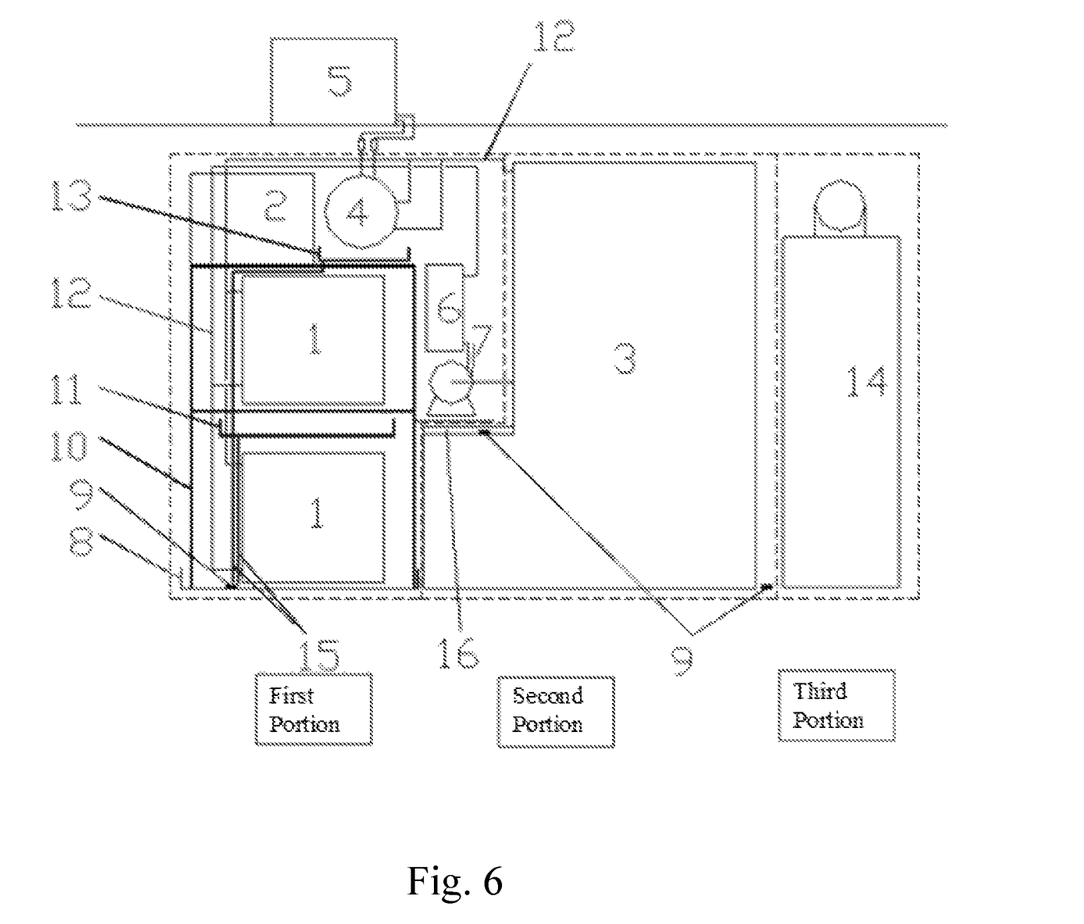
FIG. 6 is a structural schematic diagram of a box-type flow battery system.

A 175 kW/200 kWh kWh box-type flow battery system comprises a multi-stage liquid leakage collection alarm system and has a structure as shown in FIGS. 5 to 6. The box-type flow battery system may be internally divided into three portions. In the first portion, an cell stack unit, respective pipeline systems, a heat exchanger system and a battery management system are disposed at one end of a box body. In the second portion, an electrolyte storage tank is disposed at the middle section of a box body, and partition boards are mounted at two ends of the second portion so as to be separated from the other two regions. In the third portion, an energy storage inverter system and a UPS are disposed at the other end of the box body side by side.

In the first portion, the cell stack unit is disposed at the bottommost side, a BMS cabinet is disposed above the cell stack unit, an internal unit of the heat exchanger system is disposed above the cell stacks, and an external unit thereof is fixed at the top outside the box body. The respective pipeline systems are distributed in an area where the cell stack unit and the heat exchanger system are located. A multi-stage liquid leakage collection alarm system is shown in FIG. 5, wherein a first-stage liquid leakage collection tank is of a multi-layer structure comprising a first-stage liquid leakage collection tank 11, a first-stage liquid leakage collection tank guide pipe 15, a first-stage liquid leakage collection tank 13 located at the heat exchanger and a first-stage liquid leakage collection tank 16 located at a circulation pump and a filter. The first-stage liquid leakage collection tank guide pipe 15 is used for converging liquid leakages in the first-stage liquid leakage collection tank 11 located at the upper-layer cell stack unit, in the first-stage liquid leakage collection tank 13 located at the heat exchanger and in the first-stage liquid leakage collection tank 16 located at the circulation pump and the filter into a second-stage liquid leakage collection tank. The second-stage liquid leakage collection tank comprises a secondary protection groove 59 of the electrolyte storage tank, a movable baffle 61 on the secondary protection groove of the electrolyte storage tank, a liquid leakage collection tank 8 connected with an cell stack support and located at the bottom of the box body, and a liquid leakage sensing alarm 9 located on the second-stage liquid leakage collection tank.

Meanwhile, the liquid leakage sensing alarm 9 can also be mounted in the first-stage liquid leakage collection tank 16 at the circulation pump and the filter or in the first-stage liquid leakage collection tank 13 located at the heat exchanger. The liquid leakage management system is capable of determining whether the flow battery needs to perform an operation of alarming or powering off according to a detection result from the liquid leakage sensor.

Preferably, the second-stage liquid leakage collection tank may further include a communication pipe (not shown) through which the liquid leakage is discharged to the outside of box body or is recovered.

In addition, both the first-stage liquid leakage collection tank and the second-stage liquid leakage collection tank may be prepared from a plastic material resistant to electrolyte corrosion.

Figure 2:
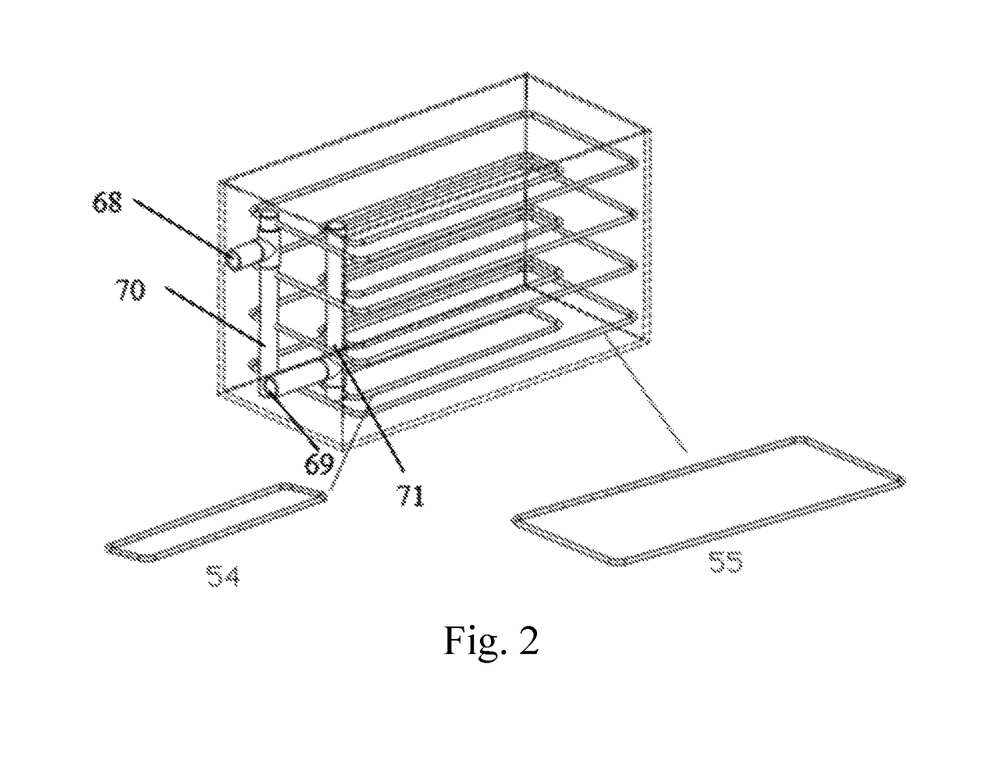
FIG. 2 illustrates internal pipelines structures of storage tanks in Embodiment 1 and Embodiment 3.
Figure 4:
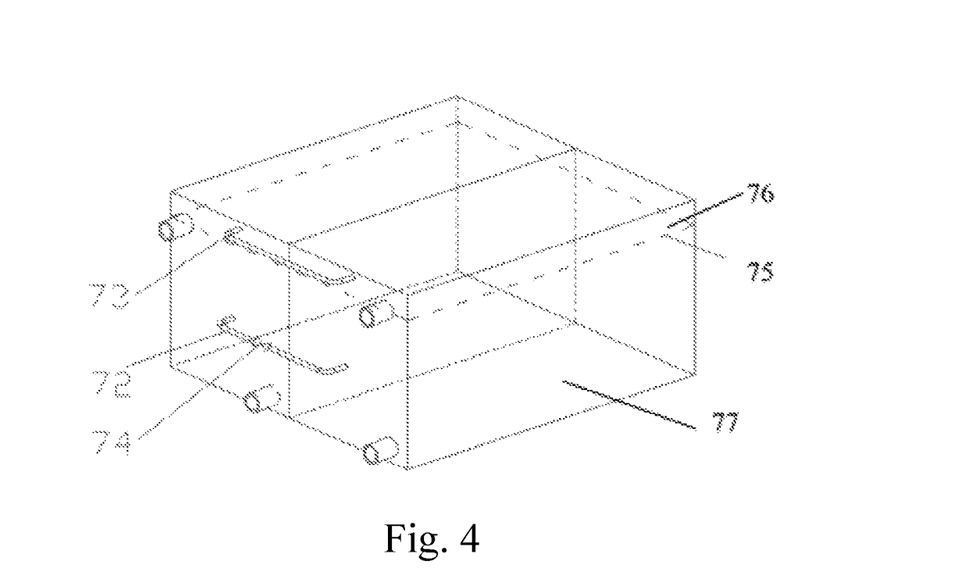
FIG. 4 illustrates a communicating pipe structure on positive and negative storage tanks.

The volume of the negative electrolyte storage tank in the second portion is 1.5 times the volume of the positive electrolyte storage tank. As shown in FIG. 4, gaseous phase portions of the positive electrolyte storage tank and the negative electrolyte storage tank are provided with pipelines 73 which are communicated with each other. Liquid phase portions of the positive electrolyte storage tank and the negative electrolyte storage tank are provided with pipelines 72 which are communicated with each other, and valves 74 located on the pipelines for communicating the liquid phase portions of the positive electrolyte storage tank and the negative electrolyte storage tank. The structure of the electrolyte storage tank is shown in FIG. 2. The electrolyte storage tank is made of glass steel and is internally provided with a plurality of layers of circular pipes. An electrolyte return inlet 68, an electrolyte return pipeline 70 and the circular pipes II 55 are communicated in sequence. The circular pipes I 54, an electrolyte output pipeline 71 and an electrolyte delivery outlet 69 are communicated in sequence. The circular pipes I 54 are disposed in the center of the electrolyte storage tank. The circular pipes II 55 are disposed in a position, close to the tank wall, of the electrolyte storage tank. The inner diameter of each of the sections of the circular pipes I 54 and the circular pipes II 55 is 30 mm. A plurality of liquid holes is distributed in the circular pipes I 54 and the circular pipes II 55. A spacing distance between every two adjacent liquid holes is 200 mm. The diameter of each liquid hole ranges from 5 mm to 12 mm. The liquid holes in each circular pipe I 54 are located in the periphery of an outer ring and the periphery of an inner ring of the circular pipe. The liquid holes in each circular pipe II 55 are only located in the periphery of an inner ring of the circular pipe.

Figure 1:
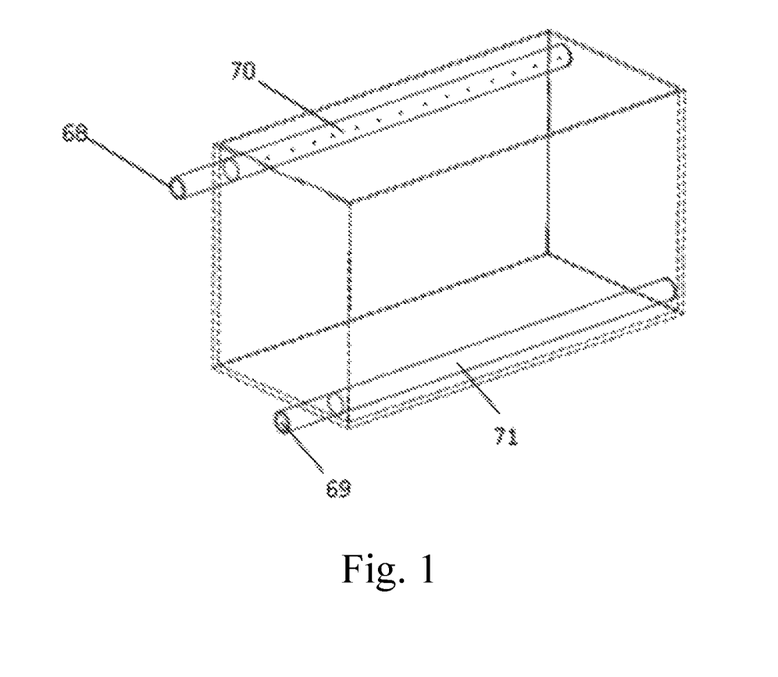
FIG. 1 illustrates an internal pipeline structure of a storage tank in the prior art.

Comparative Example 1 an internal structure of an electrolyte storage tank of a 175 kW/200 kWh box-type flow battery system is shown in FIG. 1. There is only a simple electrolyte return pipeline and an electrolyte output pipeline inside the electrolyte storage tank, but no liquid leakage collection alarm system is installed. The other component structures are the same as those of Embodiment 1.

After 200 cycles of the operation of the flow battery, the electrolyte utilization rate and SOC lag time are tested. The testing performances of the flow battery systems of two structures are as follows:

| Testing Process | Embodiment 1 | Comparative Example 1 |
| --- | --- | --- |
| Discharge capacity of discharging at rated power to cutoff voltage from 100% SOC | 183 kWh | 151 kWh |
| Discharge capacity of discharging at rated power to cutoff voltage and discharging at constant voltage to 0% SOC from 100% SOC | 207 kWh | 174 kWh |
| lag time of SOC when charging at rated power is converted to discharging at 50% SOC | 2.1 minutes | 8.8 minutes |
| lag time of SOC when charging at 0.5 times of rated power is converted to discharging at 50% SOC | 1.3 minutes | 6 minutes |
| Liquid leakage and alarm conditions after 200 cycles | An alarm is made at the beginning of electrolyte leakage, and all the electrolyte leakage is collected by the liquid leakage collection alarm system. | The electrolyte leaks directly to the ground, and the total amount of electrolyte leakage is about 5% of the total amount, thereby causing pollution. |

Embodiment 2

A 60 kW/150 kWh box-type flow battery system has a structure as in Embodiment 1. An electrolyte storage tank of the 60 kW/150 kWh box-type flow battery system is made of glass steel. The volume of a negative electrode electrolyte storage tank is 1.3 times the volume of a positive electrode electrolyte storage tank.

Figure 3:
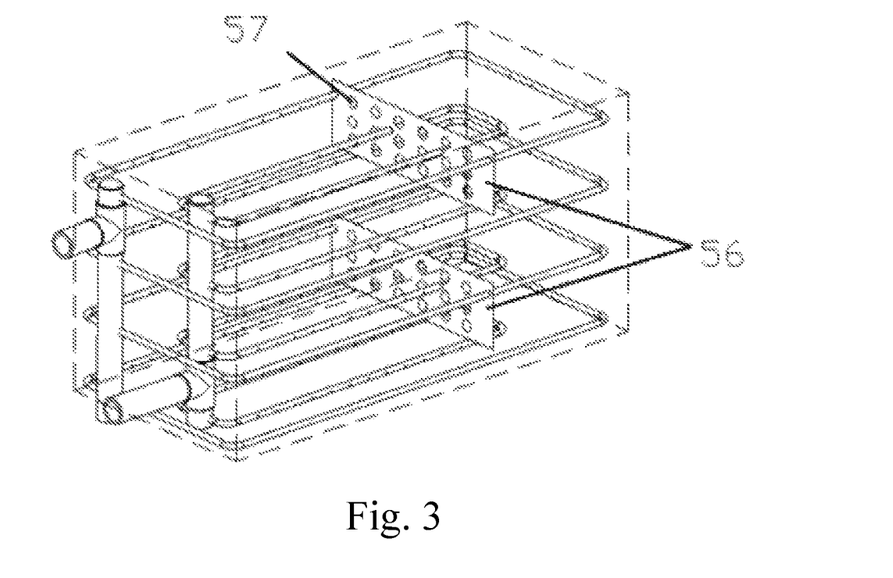
FIG. 3 illustrates an internal structure of a storage tank in Embodiment 2.

A plurality of layers of circular pipes is provided inside the electrolyte storage tank. An electrolyte return inlet 68, an electrolyte return pipeline 70 and the circular pipes II 55 are communicated in sequence. The circular pipes I 54, an electrolyte output pipeline 71 and an electrolyte delivery outlet 69 are communicated in sequence. The circular pipes II 55 are disposed in the center of the electrolyte storage tank. The circular pipes I 54 are disposed in a position, close to the tank wall, of the electrolyte storage tank. The inner diameter of each of the sections of the circular pipes II 55 and the circular pipes I 54 is 35 mm. A plurality of liquid holes is distributed in the circular pipes II 55 and the circular pipes I 54. A spacing distance between every two adjacent liquid holes ranges from 100 mm to 150 mm. The diameter of each liquid hole ranges from 3 mm to 10 mm. The liquid holes in each circular pipe II 55 are located in the periphery of an outer ring and the periphery of an inner ring of the circular pipe. The liquid holes in each circular pipe I 54 are only located in the periphery of an inner ring of the circular pipe. A support body or an orifice plate, e.g., a circular pipe support orifice plate 56 as shown in FIG. 3, for fixing the circular pipes I 54 and/or the circular pipes II 55 is also provided inside the electrolyte storage tank. The circular pipe support orifice plate 56 is provided with a plurality of through holes, i.e., holes 57 in the circular pipe support orifice plate.

Figure 10:
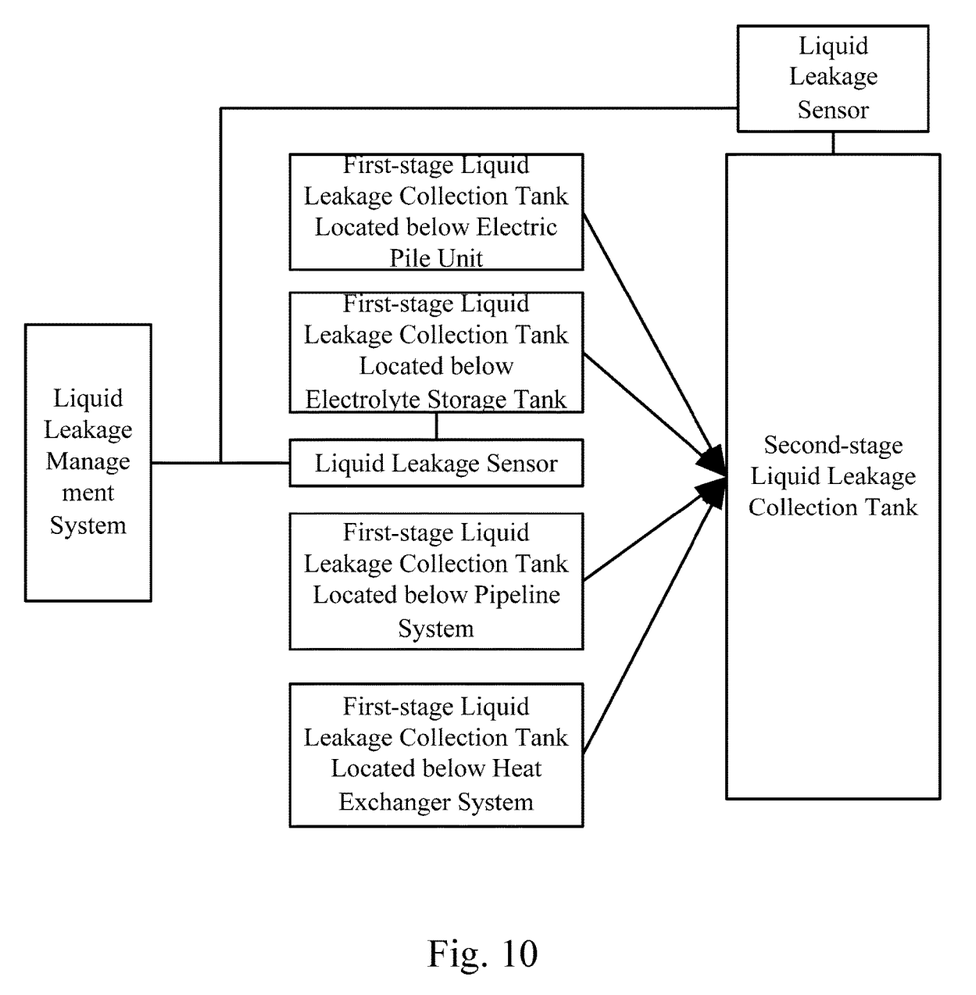

The 60 kW/150 kWh box-type flow battery system is further provided with a multi-layer liquid leakage collection alarm system. As shown in FIG. 10, the multi-layer liquid leakage collection alarm system comprises first-stage liquid leakage collection tanks which are respectively located below an cell stack unit, the electrolyte storage tank, respective pipeline systems and a heat exchanger system of the flow battery, and configured to collect liquid leaked from the cell stack unit, the electrolyte storage tank, the respective pipeline systems and the heat exchanger system; second-stage liquid leakage collection tanks which are located below a box body support of the box-type flow battery system, communicated with the corresponding first-stage liquid leakage collection tanks and configured to converge the liquid leakages collected by the first-stage liquid leakage collection tanks, wherein each second-stage liquid leakage collection tank is further provided with a liquid leakage sensor and configured to monitor whether liquid leakage appears in the second liquid leakage collection tank in real time; and a liquid leakage management system which determines whether the flow battery needs to perform an operation of alarming or powering off according to a detection result of the liquid leakage sensor.

At the same time, a liquid leakage sensor is also provided in the first-stage liquid leakage collection tank located below the electrolyte storage tank to focus on monitoring whether there is liquid leakage in the second-stage liquid leakage collection tank corresponding to the electrolyte storage tank.

Comparative Example 2 an internal structure of an electrolyte storage tank of a 60 kW/150 kWh box-type flow battery system is shown in FIG. 1. There is only a simple electrolyte return pipeline and an electrolyte output pipeline inside the electrolyte storage tank, but no liquid leakage collection alarm system is installed. The other component structures are the same as those of Embodiment 1.

After 500 cycles of the operation of the flow battery, the electrolyte utilization rate and SOC lag time are tested. The testing performances of the flow battery systems of two structures are as follows:

| Testing Process | Embodiment 2 | Comparative Example 2 |
|---|---|---|
| Discharge capacity of discharging at rated power to cutoff voltage from 100% SOC | 143 kWh | 121 kWh |
| Discharge capacity of discharging at rated power to cutoff voltage and discharging at constant voltage to 0% SOC from 100% SOC | 160 kWh | 129 kWh |
| lag time of SOC when charging at rated power is converted to discharging at 50% SOC | 2.1 minutes | 10.5 minutes |
| lag time of SOC when charging at 0.5 times of rated power is converted to discharging at 50% SOC | 1.7 minutes | 8.6 minutes |
| Liquid leakage and alarm conditions after 500 cycles | An alarm is made at the beginning of electrolyte leakage, and all electrolyte leakage is collected by the liquid leakage collection alarm system. | The electrolyte leaks directly to the ground, and the total amount of electrolyte leakage is about 8% of the total amount, thereby causing pollution. |

Embodiment 3

An electrolyte storage tank of a 100 kW/400 kWh flow battery system is made of a resin material. The volume of a negative electrode electrolyte storage tank is 1.25 times the volume of a positive electrode electrolyte storage tank. Liquid phase portions of the positive electrolyte storage tank and the negative electrolyte storage tank are provided with pipelines 72 which are communicated with each other and valves 74 located on the pipelines for communicating the positive electrolyte storage tank and the negative electrolyte storage tank. The internal structure of the storage tank is the same as in Embodiment 1. A multi-stage liquid leakage collection alarm system is as shown in FIG. 10.

Comparative Example 3 an internal structure of an electrolyte storage tank of a 100 kW/400 kWh box-type flow battery system is shown in FIG. 1. There is only a simple electrolyte return pipeline and an electrolyte output pipeline inside the electrolyte storage tank, but no liquid leakage collection alarm system is installed. The other component structures are the same as those of Embodiment 3.

After 300 cycles of the operation of the flow battery, the electrolyte utilization rate and SOC lag time are tested. The testing performances of the flow battery systems of two structures are as follows:

| Testing Process | Embodiment 3 | Comparative Example 3 |
| --- | --- | --- |
| Discharge capacity of discharging at rated power to cutoff voltage from 100% SOC | 360 kWh | 325 kWh |
| Discharge capacity of discharging at rated power to cutoff voltage and discharging at constant voltage to 0% SOC from 100% SOC | 409 kWh | 364 kWh |
| lag time of SOC when charging at rated power is converted to discharging at 50% SOC | 1.9 minutes | 8.7 minutes |
| lag time of SOC when charging at 0.5 times of rated power is converted to discharging at 50% SOC | 1.4 minutes | 6.8 minutes |
| Liquid leakage and alarm conditions after 500 cycles | An alarm is made at the beginning of electrolyte leakage, and all of the electrolyte leakage is collected by the liquid leakage collection alarm system. | The electrolyte leaks directly to the ground, and the total amount of electrolyte leakage is about 10% of the total amount, thereby causing pollution. |

Embodiment 4

Figure 9:
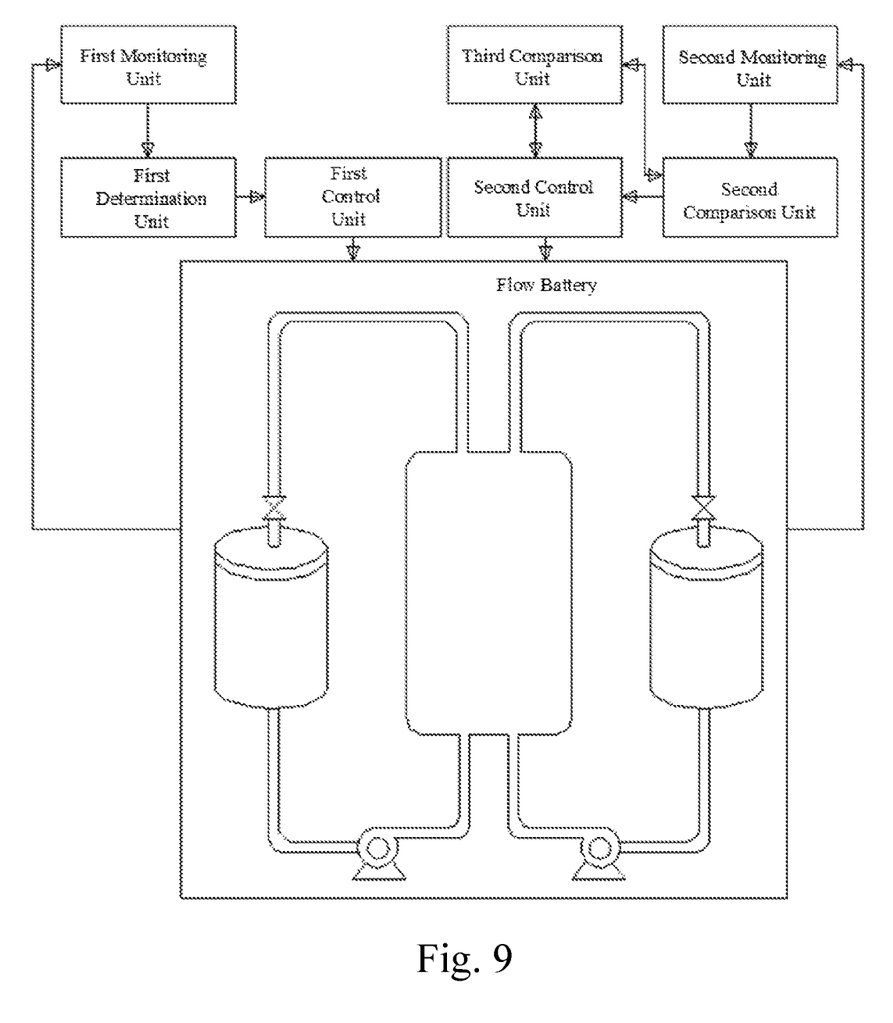
FIG. 9 is a structural schematic diagram of a flow battery comprising a flow battery charge-discharge control system of the present invention.

A flow battery comprising a flow battery discharge-discharge control system as shown in FIG. 9 is provided, wherein the flow battery charge-discharge control system comprises: a first monitoring unit configured to detect SOC of the flow battery; a first determination unit connected with the first monitoring unit and configured to determine whether the SOC of the flow battery is between an SOC lower limit and an SOC upper limit, wherein the current voltage of the flow battery is kept unchanged when the SOC of the flow battery is between the SOC lower limit and the SOC upper limit; a first control unit connected with the first determination unit and configured to adjust a voltage of the flow battery to be lower than a first preset voltage when the SOC of the flow battery is greater than or equal to the SOC upper limit, and adjust the voltage of the flow battery to be between the first preset voltage and a second preset voltage when the SOC of the flow battery is less than or equal to the SOC lower limit, the second preset voltage being higher than the first preset voltage. Moreover, the system further comprises: a second monitoring unit configured to detect a voltage of each cell stack included in the flow battery; a second comparison unit connected with the second monitoring unit and configured to compare a difference between the voltages of any two of the cell stacks with a first voltage threshold; a second control unit connected with the second comparison unit and configured to, after the second comparison unit obtains a comparison result that the difference between the voltages of any two of the battery stacks is greater than or equal to the first voltage threshold, lower the upper limit of a charge voltage of the flow battery and adjust a charge current of the flow battery when the flow battery is in a charging state, and increase the lower limit of a discharge voltage of the flow battery and adjust a discharge current of the flow battery when the flow battery is in a discharging state. Furthermore, the system further comprises a third comparison unit which is connected with the second comparison and the second control unit and configured to, after the second comparison unit obtains a comparison result that the difference between the voltages of any two of the cell stacks is less than the first voltage threshold, or after the second control unit lowers the upper limit of the charge voltage of the flow battery and adjusts the charge current of the flow battery, or lowers the upper limit of the charge voltage of the flow battery and adjusts the charge current of the flow battery, compare the difference between the voltages of any two of the cell stacks with a second voltage threshold; the second control unit controls the flow battery to power off according to a comparison result obtained by the third comparison unit that the difference between the voltages of any two cell stacks is greater than or equal to the second voltage threshold; the second comparison unit, after the third comparison unit obtains a comparison result that the difference between the voltages of any two cell stacks is less than the second voltage threshold, continues to compare the difference between the voltages of any two of cell stacks with the first voltage threshold.

Figure 7:
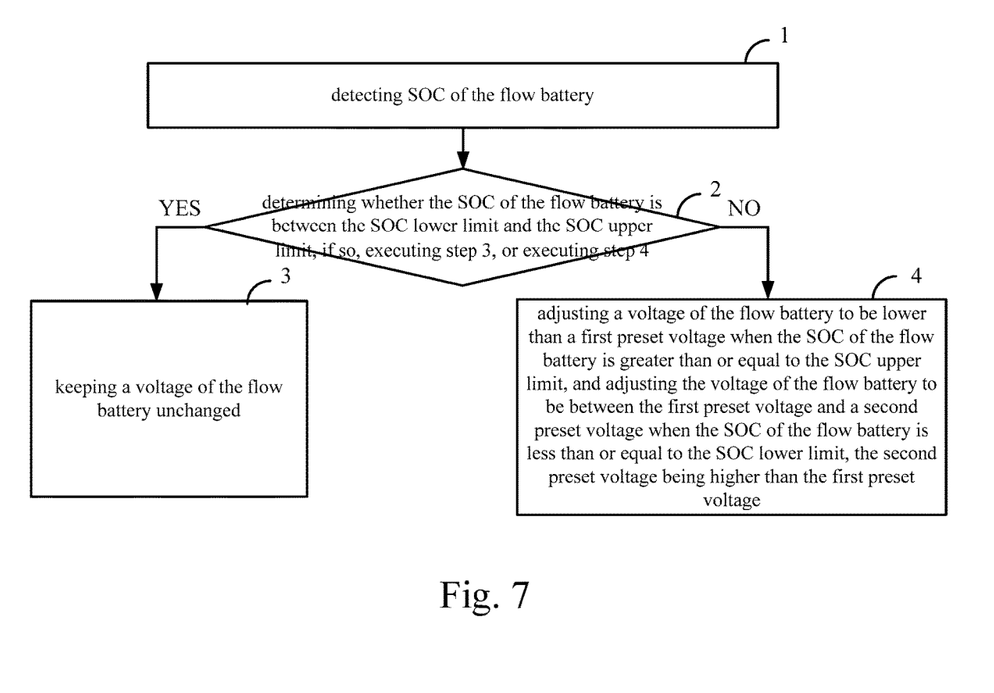
FIG. 7 is a flow flowchart from step 1 to step 4 in a flow battery charge-discharge control method of the present invention.

Based on the flow battery, the corresponding flow battery charge-discharge control method, as shown in FIG. 7, further comprises the following steps:

step 1: detecting SOC of the flow battery;

step 2: determining whether the SOC of the flow battery is between the SOC lower limit and the SOC upper limit, if so, executing step 3, or executing step 4;

step 3: keeping a voltage of the flow battery unchanged; and step 4: adjusting a voltage of the flow battery to be lower than a first preset voltage when the SOC of the flow battery is greater than or equal to the SOC upper limit, and adjusting the voltage of the flow battery to be between a first preset voltage and a second preset voltage when the SOC of the flow battery is less than or equal to the SOC lower limit, the second preset voltage being higher than the first preset voltage.

Figure 8:
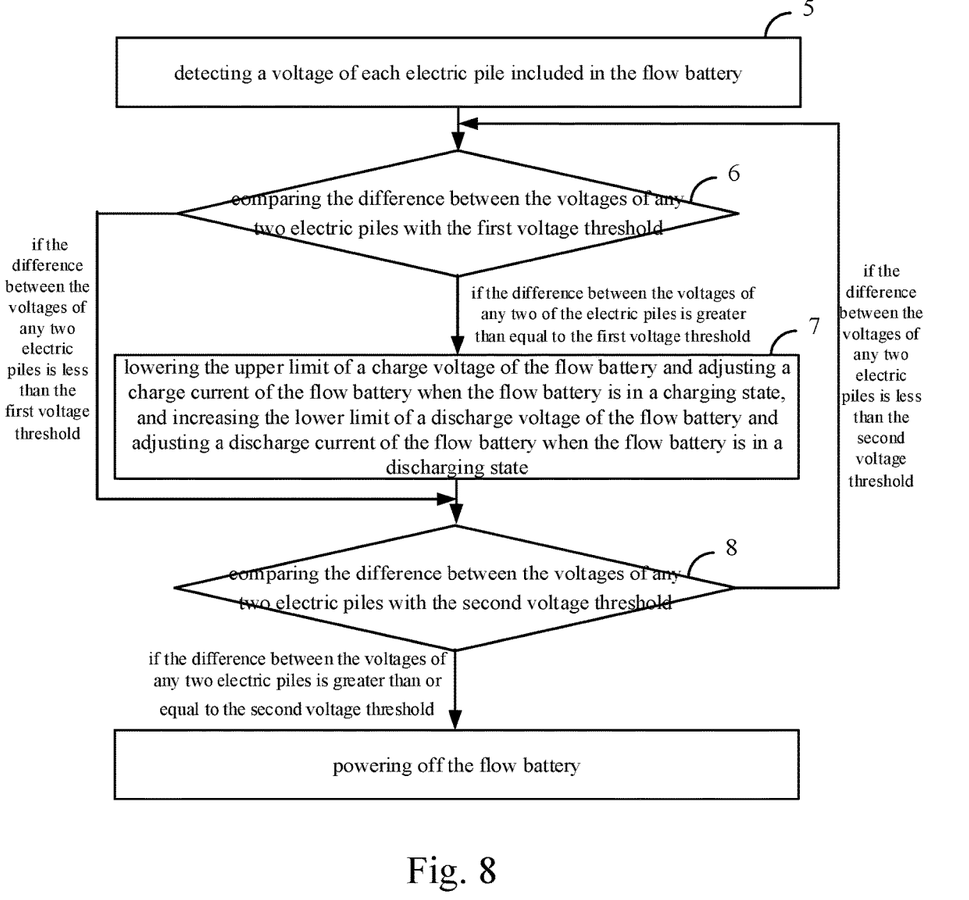
FIG. 8 is a flow flowchart from step 5 to step 8 in the flow battery charge-discharge control method of the present invention.

As shown in FIG. 8, further, after step 4, the method further comprises the following steps:

step 5: detecting a voltage of each cell stack included in the flow battery, and executing step 6;

step 6: comparing the difference between the voltages of any two cell stacks with the first voltage threshold, and executing step 7 if the difference between the voltages of any two of the cell stacks is greater than equal to the first voltage threshold;

step 7: lowering the upper limit of a charge voltage of the flow battery and adjusting a charge current of the flow battery when the flow battery is in a charging state, and increasing the lower limit of a discharge voltage of the flow battery and adjusting a discharge current of the flow battery when the flow battery is in a discharging state;

further, executing step 8 if the difference between the voltages of any two of cell stacks is less than the first voltage threshold or after executing step 7;

step 8: comparing the difference between the voltages of any two cell stacks with the second voltage threshold, powering off the flow battery if the difference between the voltages of any two cell stacks is greater than or equal to the second voltage threshold, and returning to step 6 if the difference between the voltages of any two cell stacks is less than the second voltage threshold.

Preferably, the SOC lower limit of the flow battery is 30%; the SOC upper limit is 80%; the first preset voltage is 1.55V*m, and the second preset voltage is 1.6V*m, wherein m is the number of battery cells included in the flow battery. The flow battery of the present invention comprises at least one cell stack which consists of battery cells or is formed by connecting a plurality of battery cells in series. According to the present invention, it is possible to configure the upper limit of a voltage of the flow battery according to the specific SOC conditions of the flow battery, and the problem that the flow battery is prone to side reactions under a high SOC condition and irreversible attenuation of the capacity of the flow battery while charged for a long time under a high SOC condition is avoided. In addition, for the problem that the flow battery has a limited capacity of charge or discharge under a low SOC condition, the present invention increases the charge capacity and the discharge capacity by changing the upper and lower limits of the voltage, and increases the power storage capacity and energy efficiency of the flow battery on the premise that the operating voltage of the flow battery is endurable. Specifically, when the operation of lowering the upper limit of the charge voltage of the flow battery or increasing the lower limit of the discharge voltage of the flow battery is executed, the upper limit of the charge voltage can be lowered by 0.3 V to 0.85 V or the lower limit of the discharge voltage can be increased by 0.3 V to 0.85 V each time. In the actual application, taking a 500 kW flow battery as an example, the first voltage threshold may be in the range of 3 to 10 V, and the second voltage threshold may be in the range of 5 to 15 V. In the present invention, the upper limit of the charge voltage and the lower limit of the discharge voltage can be adjusted according to the difference between the actual voltages of the cell stacks. Here, the charge current or the discharge current of the flow battery is adjusted to lower the charge current or the discharge current of the flow battery.

We claim:

1. An electrolyte storage tank provided with an electrolyte return inlet and an electrolyte delivery outlet, wherein
a circular pipe I and a circular pipe II are provided inside the electrolyte storage tank;
the circular pipe II is in communication with the electrolyte return inlet;
the circular pipe I is in communication with the electrolyte delivery outlet;
the annular perimeter of the circular pipe I is not equal to the annular perimeter of the circular pipe II;
a plurality of liquid holes are formed in walls of both of the circular pipe I and the circular pipe II.

2. The electrolyte storage tank according to claim 1, wherein
the annular perimeter of the circular pipe II is greater than the annular perimeter of the circular pipe I;
the circular pipe II is located on the periphery of the circular pipe I.

3. The electrolyte storage tank according to claim 1, wherein
the liquid holes of the circular pipe II are located on the periphery of an inner ring of the circular pipe II.

4. The electrolyte storage tank according to claim 1, wherein
the liquid holes of the circular pipe I are located on the periphery of an outer ring and/or an inner ring of the circular pipe I.

5. The electrolyte storage tank according to claim 1, wherein
the circular pipe I and the circular pipe II are in the shape of a circular ring or a square ring respectively.

6. The electrolyte storage tank according to claim 1, wherein
a plurality of layers of circular pipes I and a plurality of layers of circular pipe II are provided inside the electrolyte storage tank.

7. The electrolyte storage tank according to claim 6, wherein
the electrolyte storage tank is further provided with an electrolyte return pipeline and an electrolyte output pipeline;
the electrolyte return inlet, the electrolyte return pipeline and the circular pipe II are communicated in sequence;
the circular pipe I, the electrolyte output pipeline and the electrolyte delivery outlet are communicated in sequence.

8. The electrolyte storage tank according to claim 1, wherein
the circular pipe II is affixed to the inner wall of the electrolyte storage tank.

9. A flow battery comprising the electrolyte storage tank of claim 1.

10. The flow battery according to claim 9, comprising a negative electrolyte storage tank and a positive electrolyte storage tank, wherein the volume of the negative electrolyte storage tank is greater than the volume of the positive electrolyte storage tank.

11. The flow battery according to claim 10, wherein a ratio of the volume of the positive electrolyte storage tank to the volume of the negative electrolyte storage tank is 1:(1.1 to 1.5).

12. The flow battery according to claim 9, wherein the flow battery is provided with a pipeline for communicating a gaseous phase portion of the positive electrolyte storage tank and a gaseous phase portion of the negative electrolyte storage tank.

13. The flow battery according to claim 9, wherein a pipeline and a valve for communicating a liquid phase portion of the positive electrolyte storage tank and a liquid phase portion of the negative electrolyte storage tank are provided at the bottom of the positive electrolyte storage tank and the negative electrolyte storage tank respectively.

14. The flow battery according to claim 9, wherein the flow battery further comprises a flow battery charge-discharge control system, the flow battery charge-discharge control system comprising:
a first monitoring unit configured to detect SOC of the flow battery;
a first determination unit connected with the first monitoring unit and configured to determine whether the SOC of the flow battery is between an SOC lower limit and an SOC upper limit, wherein the current voltage of the flow battery is kept unchanged when the SOC of the flow battery is between the SOC lower limit and the SOC upper limit; and
a first control unit connected with the first determination unit and configured to adjust a voltage of the flow battery to be lower than a first preset voltage when the SOC of the flow battery is greater than or equal to the SOC upper limit, and adjust the voltage of the flow battery to be between a first preset voltage and a second preset voltage when the SOC of the flow battery is less than or equal to the SOC lower limit, the second preset voltage being higher than the first preset voltage.

15. The flow battery according to claim 14, wherein the flow battery charge-discharge control system further comprises:
a second monitoring unit configured to detect a voltage of each cell stack included in the flow battery;
a second comparison unit connected with the second monitoring unit and configured to compare a difference between the voltages of any two of the cell stacks with a first voltage threshold; and
a second control unit connected with the second comparison unit and configured to, after the second comparison unit obtains a comparison result that the difference between the voltages of any two of the cell stacks is greater than or equal to the first voltage threshold, lower the upper limit of a charge voltage of the flow battery and adjust a charge current of the flow battery when the flow battery is in a charging state, and increase the lower limit of a discharge voltage of the flow battery and adjust a discharge current of the flow battery when the flow battery is in a discharging state.

16. The flow battery according to claim 15, wherein the flow battery charge-discharge control system further comprises:
a third comparison unit connected with the second comparison unit and the second control unit and configured to, after the second comparison unit obtains a comparison result that the difference between the voltages of any two of the cell stacks is less than the first voltage threshold, or after the second control unit lowers the upper limit of the charge voltage of the flow battery and adjusts the charge current of the flow battery, or lowers the upper limit of the charge voltage of the flow battery and adjusts the charge current of the flow battery, compare the difference between the voltages of any two of the cell stacks with a second voltage threshold; the second control unit controls the flow battery to power off according to a comparison result obtained by the third comparison unit that the difference between the voltages of any two cell stacks is greater than or equal to the second voltage threshold; the second comparison unit, after the third comparison unit obtains a comparison result that the difference between the voltages of any two cell stacks is less than the second voltage threshold, continues to compare the difference between the voltages of any two of cell stacks with the first voltage threshold.

17. A box-type flow battery system comprising the flow battery of claim 9, wherein the flow battery further comprises a cell stack unit disposed on a box body support, a heat exchanger system and respective pipeline systems, wherein
the flow battery system further comprises a multi-stage liquid leakage collection alarm system, the multi-stage leakage collection alarm system at least comprising first-stage liquid leakage collection tanks, second-stage liquid leakage collection tanks, and a liquid leakage management system;
the first-stage liquid leakage collection tanks are respectively located below the cell stack unit, the electrolyte storage tank, the pipeline systems and the heat exchanger system of the flow battery, and configured to collect liquid leaked from the cell stack unit, the electrolyte storage tank, and the respective pipeline systems and the heat exchanger system;
the second-stage liquid leakage collection tanks are located below the box body of the box-type flow battery system, communicated with the corresponding first-stage liquid leakage collection tanks and configured to converge the liquid leakages collected by the first-stage liquid leakage collection tanks; each second-stage liquid leakage collection tank is further provided with a liquid leakage sensor configured to monitor whether liquid leakage appears in the second-stage liquid leakage collection tank in real time;
the liquid leakage management system determines whether the flow battery needs to perform an operation of alarming or powering off according to a detection result of the liquid leakage sensor.

18. A flow battery charge-discharge control method for controlling a charge-discharge process of the flow battery according to claim 9, wherein the method comprises the following steps:
step 1: detecting SOC of the flow battery;
step 2: when the SOC of the flow battery is between the SOC lower limit and the SOC upper limit, executing step 3, or executing step 4;
step 3: keeping a voltage of the flow battery unchanged; and
step 4: adjusting a voltage of the flow battery to be lower than a first preset voltage when the SOC of the flow battery is greater than or equal to the SOC upper limit, and adjusting the voltage of the flow battery to be between the first preset voltage and a second preset voltage when the SOC of the flow battery is less than or equal to the SOC lower limit, the second preset voltage being higher than the first preset voltage.

19. The flow battery charge-discharge control method according to claim 18, wherein
after the step 4, the method further comprises the following steps:
step 5: detecting a voltage of each cell stack included in the flow battery, and executing step 6;
step 6: comparing the difference between the voltages of any two cell stacks with the first voltage threshold, and executing step 7 when the difference between the voltages of any two of the cell stacks is greater than or equal to the first voltage threshold; and
step 7: lowering the upper limit of a charge voltage of the flow battery and adjusting a charge current of the flow battery when the flow battery is in a charging state, and increasing the lower limit of a discharge voltage of the flow battery and adjusting a discharge current of the flow battery when the flow battery is in a discharging state.

20. The flow battery charge-discharge control method according to claim 19, comprising:
executing step 8 when the difference between the voltages of any two of cell stacks is less than the first voltage threshold or after step 7 is executed; and
step 8: comparing the difference between the voltages of any two cell stacks with the second voltage threshold, powering off the flow battery when the difference between the voltages of any two cell stacks is greater than or equal to the second voltage threshold, and returning to step 6 when the difference between the voltages of any two cell stacks is less than the second voltage threshold.

\* \* \* \* \*